United States Patent [19]
Cline

[11] Patent Number: 4,788,423
[45] Date of Patent: Nov. 29, 1988

[54] TWO-MIRROR SCANNING SYSTEM

[75] Inventor: Richard W. Cline, Santa Barbara, Calif.

[73] Assignee: Santa Barbara Research Center, Goleta, Calif.

[21] Appl. No.: 53,974

[22] Filed: May 26, 1987

[51] Int. Cl.⁴ ............................................. H01J 5/16
[52] U.S. Cl. ...................................... 250/235; 350/6.9
[58] Field of Search ....................... 250/234, 235, 236; 350/6.6, 6.9, 6.91, 486

[56] References Cited

U.S. PATENT DOCUMENTS

| 3,919,527 | 11/1975 | Bowen | 350/6.6 |
| 4,283,145 | 8/1981 | Miyazawa | 350/6.6 |
| 4,695,721 | 9/1987 | Fulkerson | 250/236 |

OTHER PUBLICATIONS

G. Marshall, "Scanning Devices and Systems" in *Applied Optics and Optical Engineering*, vol. 6, pp. 203-262 (1980).

W. Wolfe, "Optical-Mechanical Scanning Techniques and Devices" in The Infrared Handbook, Office of Novel Research, Chapter 10, (1978).

Primary Examiner—David C. Nelms
Assistant Examiner—Jessica L. Ruoff
Attorney, Agent, or Firm—W. C. Schubert; V. G. Laslo; A. W. Karambelas

[57] ABSTRACT

An optical scanning system (10) is disclosed for scanning a wide incoming field of view of at least 60 degrees. The system (10) incorporates two flat mirrors (12,26) which rotate about two axes (20,28). The motion of the two mirrors is synchronized. The resulting scanned image is directed onto a sensor (54) with minimal rotation and distortion of the image.

10 Claims, 3 Drawing Sheets

Case 1

Case 2

Case 3

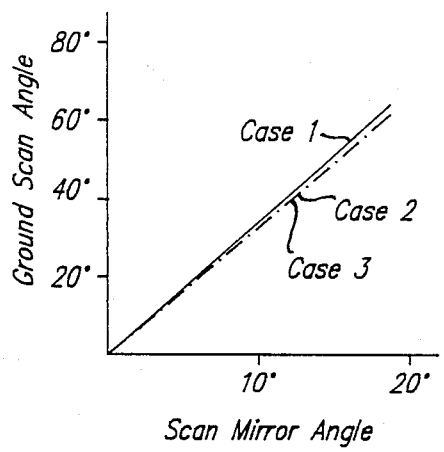
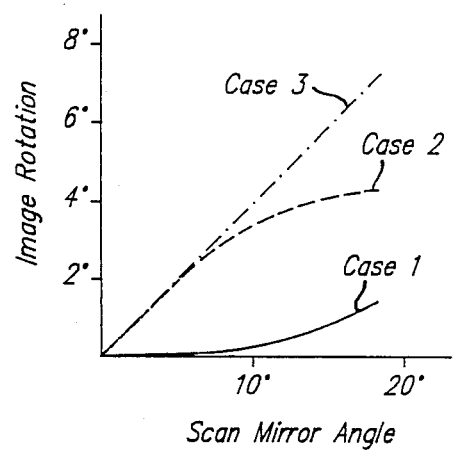
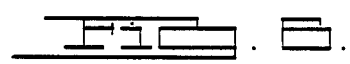
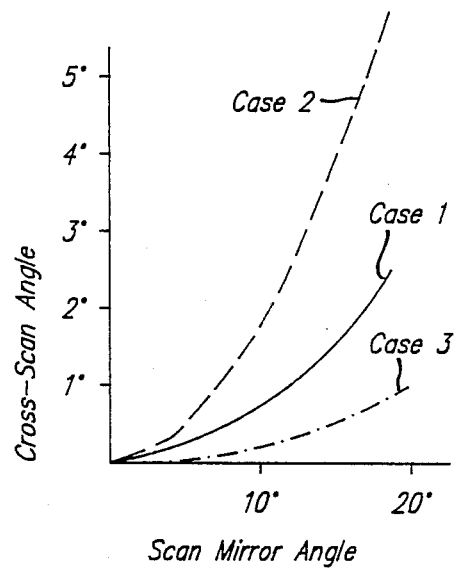
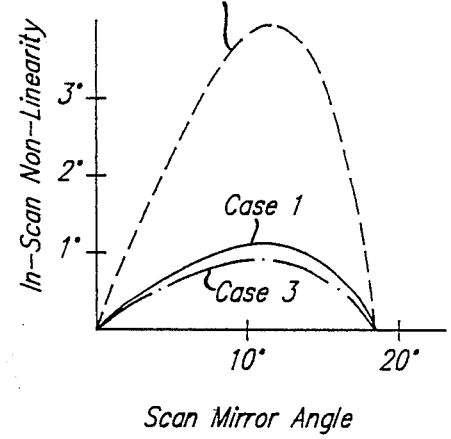

TWO-MIRROR SCANNING SYSTEM

BACKGROUND OF THE INVENTION

1. Field of the Invention

The present invention relates generally to optical scanning systems, and particularly to a two-mirror reflective scanning system in which the motion of the two mirrors are coupled to provide a wide field of view to an optical sensor.

2. Description of Related Art

Many kinds of optical scanning systems have been developed in recent years. These systems are used for photographing and measuring light in both airborne and ground based systems. For example, ground based scanners may be used in systems such as telescopes, radiometers, motion picture camera systems and laser scanners. Optical scanners are also found in a variety of airborne applications, including, for example, aircraft, spacecraft and satellites. Both ground based and airborne scanners may be used for observation of the Earth, objects on the Earth or objects in Space.

In general, the light output of an optical scanner is directed onto a light sensor. For example, the sensor may be a photographic film, an electronic photodetector or the human eye. The spectrum of light viewed by optical scanners may be a narrow bandwidth or wide bandwidth and this spectrum may range from infrared through ultraviolet.

A basic requirement of all scanning systems is the ability to scan, i.e. to direct light from a range of angular positions to a sensor with a limited field of view. Scanning requires motion of one or more optical devices to sweep the light across a fixed sensor. Unfortunately, a number of changes in the light image are often introduced by this motion of the scanner's optical devices during the scanning process. Additional changes may be introduced when the incoming light is reflected or refracted by the optical devices in the scanner. These alterations are generally undesirable. They include distortion, image rotation, polarization and vignetting. Numerous systems have been developed in an effort to avoid or compensate for these alterations in the image. A further discussion of scanning systems may be found in J. Marshall, "Scanning Devices and Systems" in *Applied Optics and Optical Engineering*, Vol. 6, pp. 204–262 (1980), and also in W. Wolfe, "Optical—Mechanical Scanning Techniques and Devices" in *The Infrared Handbook*, Office of Naval Research, chapter 10, (1978).

It will be appreciated that undesirable alterations in the optical image are increased as the field of view is increased. For example, scanning over a wide field of view will usually result in considerable image rotation, image distortion and vignetting. Another factor is the type of optical device utilized. Optical scanning systems may use reflective or refractive optical components or a combination of these two. However, refractive systems of large diameter generally are more expensive and may introduce greater distortion and polarization of the image than reflective systems.

In sum, it would be desirable to have a optical scanning system which can scan over a wide field of view, for example, 60 degrees, without significant rotation of the image, without vignetting and without image distortion. It would also be desirable to have such an optical system utilize inexpensive reflective components rather than refractive components.

SUMMARY OF THE INVENTION

The present invention provides a two-mirror scanning system which can scan over a wide field of view. A first mirror is mounted at an angle with respect to the direction of the incoming light. This mirror is rotated about an axis to scan a desired field of view. Light reflected from this mirror is directed to a second mirror which is mounted at an angle with respect to the light incident to it. The second mirror is mounted on a second axis. This second mirror is coupled to the first mirror so that the motions of the two are synchronized. Light is then reflected from the second mirror onto a sensor. The image received by this sensor will have minimal rotation as the field of view is scanned. Further, vignetting, image distortion and polarization are kept to a minimum.

BRIEF DESCRIPTION OF THE DRAWINGS

The various advantages and features of the present invention will become apparent to one skilled in the art from the detailed description of the preferred embodiment which makes reference to the following set of drawings:

FIG. 5 shows a graph of the ground scan angle as a function of the scan mirror angle for the three cases shown in FIGS. 2–4;

FIG. 6 shows a graph of the image rotation as a function of the scan mirror angle for the three cases shown in FIGS. 2–4;

FIG. 7 shows a graph of the cross-scan angle as a function of The scan mirror angle for the three cases shown in FIGS. 2–4; and FIG. 8 shows a graph of the in-scan nonlinearity as a function of the scan mirror angle for the three cases shown in FIGS. 2–4.

DESCRIPTION OF THE PREFERRED EMBODIMENT

Figure 1:
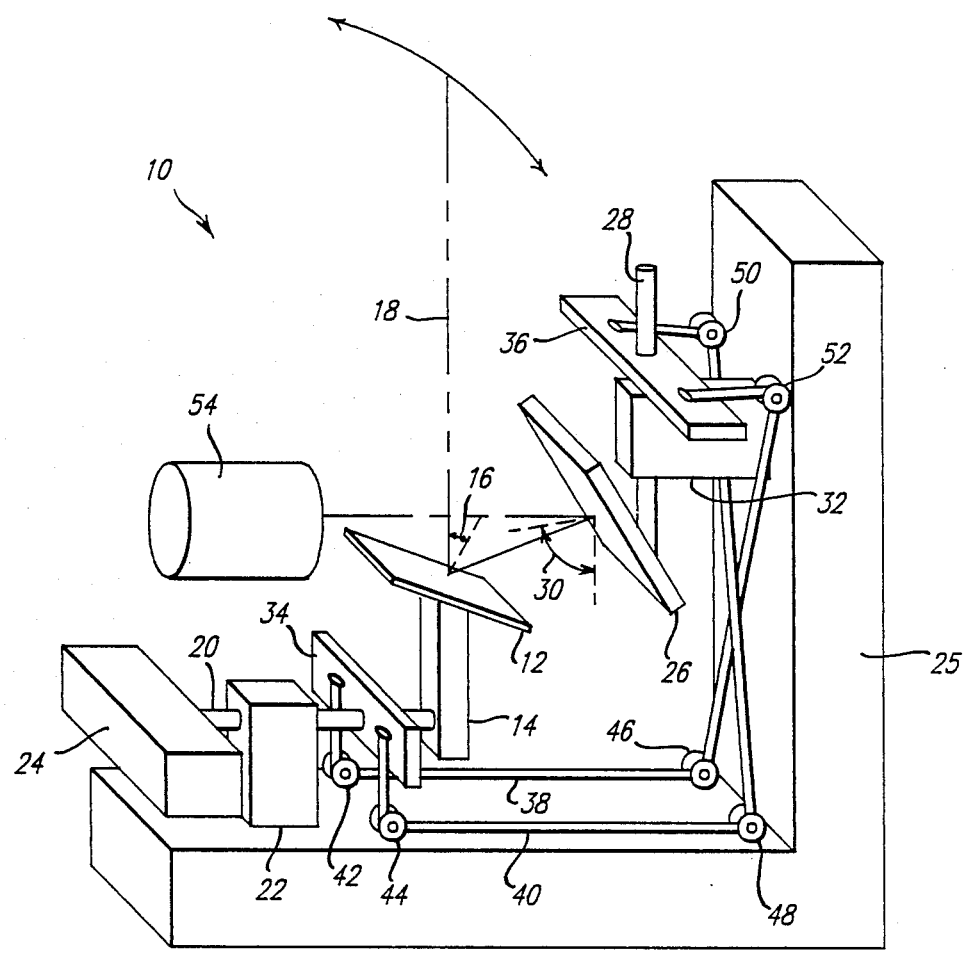
FIG. 1 is a diagram of a two-mirror scanning system made in accordance with the teachings of the preferred embodiment of the invention.

Referring to FIG. 1, a diagram of a two-mirror scanning system 10, according to the present invention, is shown. The two-mirror scanning system 10 includes a first mirror 12 which is attached to a post 14 at an angle 16 with respect to incoming light 18. Post 14 is mounted to one end of shaft 20. Shaft 20 is held in place by support post 22. At its other end, shaft 20 is also attached to a drive system 24. Angular motion introduced by the drive system 24 will cause the first mirror 12 to rotate about an axis defined by the shaft 20. Thus, post 14 displaces mirror 12 away from its axis of rotation. This helps avoid vignetting with a minimum mirror size. For example, in the preferred embodiment, the sensor 54 clear aperture utilizes greater than 90% of the mirror width.

Support post 22 is mounted to the horizontal portion of an "L" bracket 25. A second mirror 26 is attached to a shaft 28 at an angle 30 with respect to the shaft 28. Mirror 26 can thus rotate about an axis defined by shaft 28. Shaft 28 is held perpendicular to shaft 20 by a second support post 32. Support post 32 is mounted to the vertical portion of the "L" bracket 25.

A pair of rotation coupling means 34 and 36 are attached to shafts 20 and 28 respectively. The motion of the rotation coupling arm 36 is coupled to that of rotation coupling arm 34 by cables 38 and 40 which translate the rotational motion of shaft 20 to shaft 28 by means of six pulleys 42, 44, 46, 48, 50 and 52.

Figure 2:
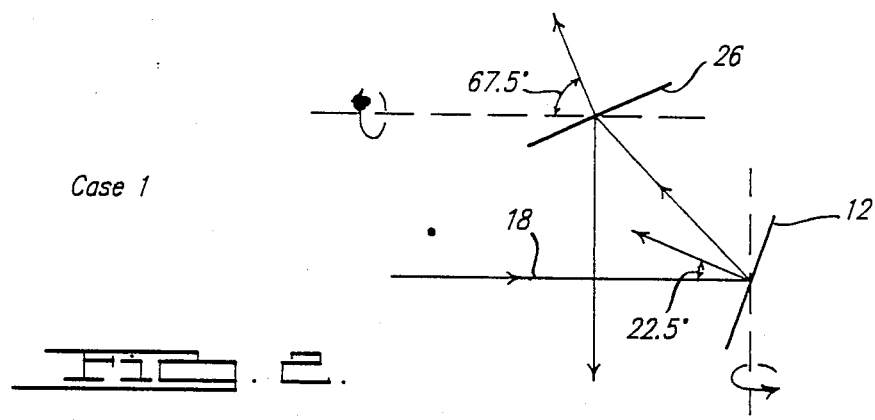
FIGS. 2, 3 and 4 define mirror angles in three different embodiments of the two mirror scanning system shown in FIG. 1.
Figure 3:
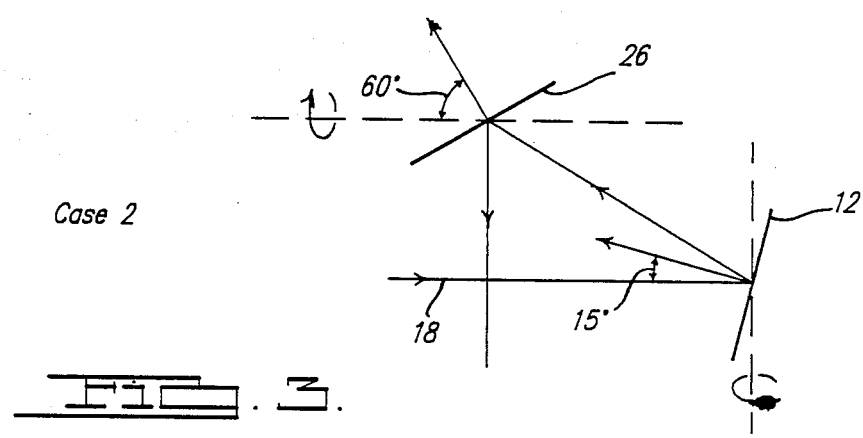
Figure 4:
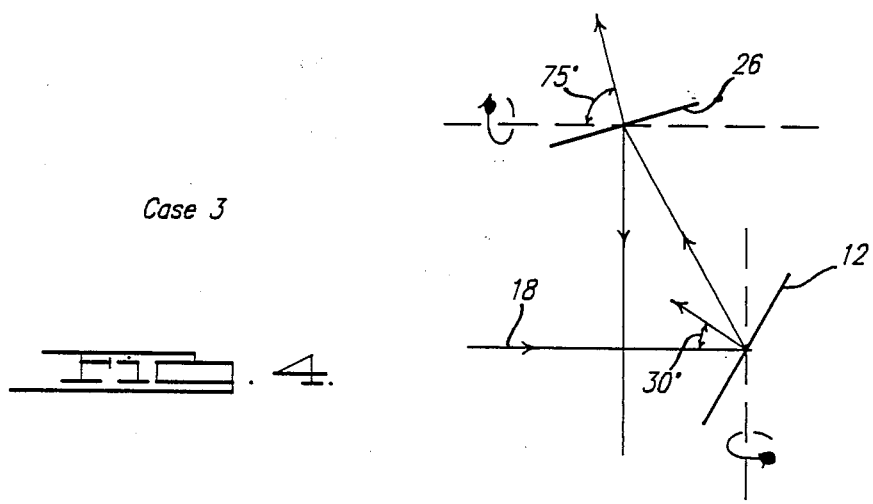

The preferred mirror angles as shown in FIG. 2. In this example, labeled "case 1", the angle 16 which is associated with the first mirror 12 is equal to 22.5 degrees. This is the angle between the direction of the incident light 18 and a line normal to the first mirror 12. The other angle 30 which is associated with the second mirror 26 is equal to 67.5 degrees. This angle is defined as the angle between the axis about which the second mirror 26 rotates and the line normal to the second mirror 26. Two other examples of mirror angles are shown for comparison, in FIG. 3 and in FIG. 4. These examples are labeled "case 2" and "case 3" respectively.

The results of an optical analysis conducted on the present invention is shown in FIGS. 5-8. The analysis assumes that the first mirror 12 rotates at the same rate as the second mirror 26. As will be appreciated, a system could easily be employed in which the mirrors rotate at different angular rates yielding different results.

FIG. 5 illustrates the relationship between the angular rotation of the first mirror 12 labeled "scan mirror angle" and the angle of the scanned field of view labeled "ground scan angle". Ground scan angle is the angle over which light is received by the sensor 54. Thus, for all three cases, when the first mirror rotates a total of 18 degrees, a total of about 60 degrees may be scanned by the sensor.

FIG. 6 shows the results of the analysis of image rotation for three cases. Here, case 1 yields a total image rotation of only 1.4 degrees over the total scan-mirror angle of 18 degrees. FIG. 7 illustrates the results of the analysis of cross-scan angle for the three cases. These results indicate that the non linearity along the tracking direction for case 1 is a maximum of about 2.4 degrees over the entire scan-mirror angle of 18 degrees. FIG. 8 illustrates the in-scan nonlinearity analysis for the three cases. This shows that the nonlinearity along the direction of the scan reaches a maximum of about 0.11 degrees for case 1. A computer program which performed the analysis shown in FIGS. 5-8 is listed in Table 1.

As the above analysis indicates, the present invention discloses a two mirror optical scanning system which can scan over a wide field of view without serious image rotation, and without distortions in the image. Vignetting is minimized by the use of a displaced axis for the first mirror. The use of flat mirrors minimizes cost as well as polarization of the image. As a result, this scanner can be adapted to a variety of uses.

Those skilled in the art will come to appreciate that other advantages and modifications of the particular examples set forth herein are obtainable without departing from the spirit of the invention as defined in the following claims.

What is claimed is:

1. An apparatus for receiving incident light from a scanned field of view and directing said incident light onto a sensor, said apparatus comprising:
   (a) a first mirror;
   (b) a second mirror;
   (c) the first mirror being mounted at a first angle on a post, said post having an axis parallel to the incident light;
   (d) the second mirror being mounted at a second angle for receiving incident light received from the first mirror, said second mirror serving to reflect light to the sensor;
   (e) first rotation means for rotating the post about a first axis perpendicular to the incident light;
   (f) second rotation means for rotating the second mirror about a second axis parallel to the incident light; and
   (g) synchronization means for coupling the rotation of the post about the first axis with the rotation of the second mirror about the second axis, whereby the incident light is reflected from the first mirror to the second mirror and then to the sensor to permit a field of view to be scanned and imaged by the sensor.

2. The apparatus of claim 1 wherein said first angle at which the first mirror is mounted is 22.5 degrees with respect to the axis of the post; and said second angle at which the second mirror is mounted is 67.5 degrees with respect to the second axis.

3. The apparatus of claim 1 where said synchronization means causes the rate of rotation of the post about the first axis to be equal to the rate of rotation of the second mirror about the second axis.

4. The apparatus of claim 1 where said first axis is connected to a drive system including means for perodically rotating the first axis through a predetermined angular range of motion.

5. The apparatus of claim 1 further comprising a frame for mounting both the first rotation means and the second rotation means in a fixed relationship with respect to each other.

6. The apparatus of claim 1 where said sensor is an electronic infrared photodetector.

7. The apparatus of claim 1 where said first mirror and said second mirror are both flat mirrors.

8. The apparatus of claim 1 where said synchronization means comprises:
   (a) a first rotation coupling arm attached to the first axis;
   (b) a second rotation coupling arm attached to the second axis; and
   (c) coupling means for translating motion of the first rotation coupling arm to the second rotation coupling arm.

9. The apparatus of claim 1 where said coupling means includes a pair of cables connected to said first and second coupling means and a system of pulleys which translate rotational motion about the first axis to rotational motion about the second axis.

10. An apparatus for receiving incident light from a scanned field of view and directing said incident light onto a sensor, said apparatus comprising:
    (a) a first flat mirror;
    (b) a second flat mirror;
    (c) the first mirror being mounted on a post at an angle of 22.5 degrees with respect to the post, said post having an axis parallel to the incident light;
    (d) the second mirror being mounted on a second axis at an angle of 67.5 degrees with respect to the second axis for receiving incident light received from the first mirror, said second mirror serving to reflect light to the sensor;

(e) first rotation means for rotating the post about a first axis perpendicular to the incident light;
(f) second rotation means for rotating the second mirror about the second axis parallel to the incident light;
(g) synchronization means for coupling the rotation of the post about the first axis with the rotation of the second mirror about the second axis where said synchronization means causes the rate of rotation of the post about the first axis to be equal to the rate of rotation of the second mirror about the second axis, said synchronization means including; a first rotation coupling arm attached to the first axis, a second rotation coupling arm attached to the second axis, and coupling means for translating motion of the first rotation coupling arm with the motion of the second rotation coupling arm, whereby the incident light is reflected from the first mirror to the second mirror and then to the sensor to permit a field of view of about 60 degrees to be scanned and imaged by the sensor;
(h) a frame for mounting both the first rotation means and the second rotation means in a fixed relationship with respect to each other; and
(i) drive means connected to said first axis for periodically rotating the first axis through a predetermined angular range of motion.

* * * * *